P. DUCONDU.
DEVICE FOR LOADING AND UNLOADING VEHICLES.
APPLICATION FILED JULY 25, 1919.

1,369,011.

Patented Feb. 22, 1921.

Inventor
Paul Ducondu
By Fetherstonhaugh Co
Attys.

UNITED STATES PATENT OFFICE.

PAUL DUCONDU, OF MONTREAL, QUEBEC, CANADA.

DEVICE FOR LOADING AND UNLOADING VEHICLES.

1,369,011.                 Specification of Letters Patent.      Patented Feb. 22, 1921.

Application filed July 25, 1919. Serial No. 313,188.

*To all whom it may concern:*

Be it known that I, PAUL DUCONDU, a subject of the King of Great Britain, and resident of the city of Montreal, in the Province of Quebec and Dominion of Canada, have invented certain new and useful Improvements in Devices for Loading and Unloading Vehicles, of which the following is a full, clear, and exact description.

This invention relates to improvements in wagon loading devices, and the object is to provide a simple, durable, inexpensive and easily operated device for attachment to a wagon or lorry by means of which a single individual may easily handle heavy objects in loading or unloading the vehicle.

The device consists briefly of a loading or unloading platform connected to the vehicle by a suitable framework and provided with a hoisting device for raising and lowering the same.

In the drawings which illustrate the invention;—

Figure 1:
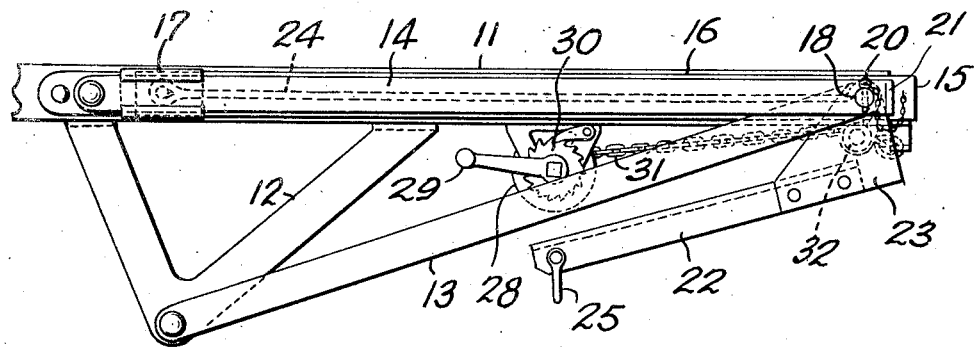
Figure 1 is a side elevation of the device folded in traveling position.

Referring more particularly to the drawings, 11 designates the floor of a wagon or lorry to each side edge of which a depending bracket 12 is secured. To each bracket a link 13 is pivotally connected at one end and to each side of the vehicle floor a link 14 is pivotally connected, preferably at a point slightly in front of the point of pivotal connection of the link 13. A U-shaped member is provided having a central transverse portion 15 and parallel arms or side portions 16 connected therewith. This member is adapted to pass around the rear end of the vehicle floor and lie close against the side edges and the rear edge thereof. The free extremities of the U-shaped member are each provided with a pivotally mounted slide 17 embracing the link 14. The side portions 16 of the U-shaped member are pivotally connected adjacent the central end portion 15 to the free extremities of the links 13 by bolts or studs 18. Apertures 19 are provided on the free extremities of the links 14 and adapted to receive the studs 18, which may be provided with cotter pins 20 to retain both the links 13 and 14. Any suitable form of stop 21 may be provided on the free end of each link 14 to prevent it being drawn through its slide 17.

The loading platform comprises a pair of similar side rails 22 pivotally mounted by means of brackets 23 on the studs 18. The brackets are located at what may be termed the forward end of the platform and the rear end is supported by means of links 24, pivotally connected to the free extremities of the arms 16 preferably by the same means as the slides 17. The free ends of these links are hooked or otherwise suitably formed to engage eyes 25 mounted at the rear corners of the platform. A suitable floor 26 is mounted between the side members 22 and may be composed in part of the tail-board 27 of the vehicle.

The hoisting apparatus comprises a chain drum 28 journaled under the floor 11 and operated by a crank or other suitable means 29, a ratchet and pawl 30 being provided to lock the drum. A pair of chains 31 pass rearwardly from the drum and over rollers 32 secured under the rear edge of the vehicle floor and are then connected in any suitable manner to the central portion 15 of the U-shaped frame adjacent the arms 16 thereof.

Figure 2:
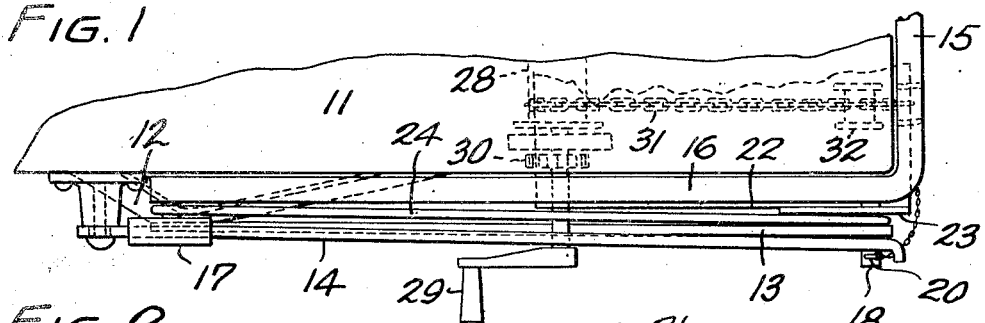
Fig. 2 is a partial plan view of the device.
Figure 3:
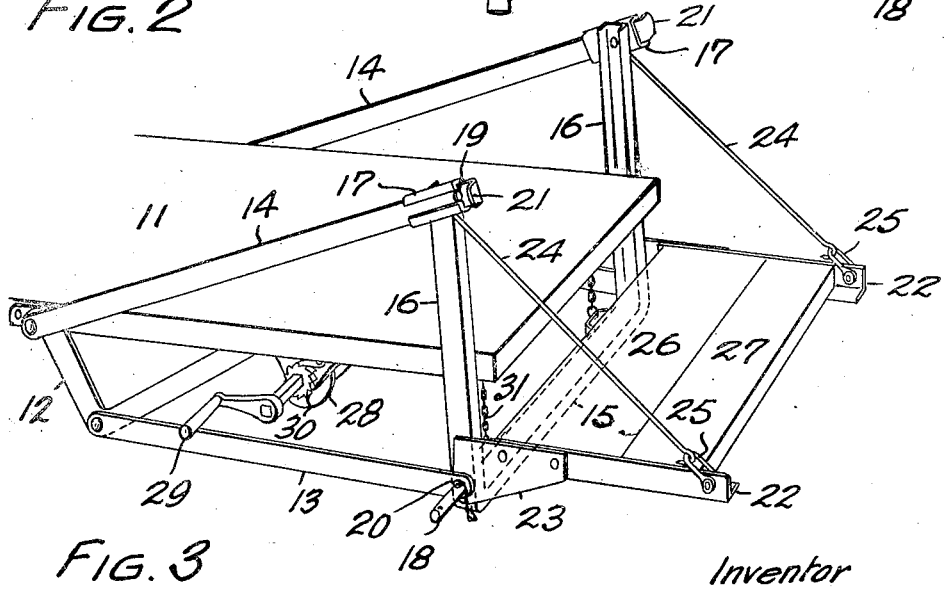
Fig. 3 is a perspective view of the device in operative position.

When in its traveling position on a vehicle, the unloading device is arranged as shown in Figs. 1 and 2, the U-shaped member being disposed in the same plane as the floor and the links 14 lying outside the arms 16 and being passed at their free ends over the studs 18 where they are held by the cotter pins 20. The links 24 lie between the links 14 and arms 16 and their free ends are supported by the studs 18. The loading platform is swung under the vehicle floor and retained by any suitable fastening device (not shown).

When the operator desires to load or unload the vehicle, the loading platform is unfastened and swung into substantially the same plane as the vehicle floor. The vehicle tail-board is placed on the loading platform frames if it is desired to increase the size of the platform. It will be obvious that if a large tail-board is used, it may form the entire floor of the loading platform or that the loading platform floor may be of adequate size without the addition of the tail-board. The cotter pins 20 are removed and the links 14 and 24 disengaged from the studs 18. The slides 17 are now moved from their raised position near the pivoted ends of the links 14 to the free ends of the links, with the result that the U-frame is swung to a substantially vertical position about its point of pivotal attachment to the links 13. The links 24 are now connected to the eyes 27 of the loading platform. It will be seen that the structure is now a cantaliver truss supported between its ends by chains 31 and anchored at one end to the vehicle floor. The members 13 and 22 constitute the bottom chords and the members 14 and 24 the top chords, while the arms 16 are braces between the bottom and top chords. The platform is now lowered by revolving the drum 28. To return the device to traveling position, the operations just described are reversed. The load of the vehicle is placed upon the loading platform at the appropriate time according to whether a loading or unloading operation is to be performed. When erected in operative position, the structure is always a cantaliver truss, regardless of the change of shape in the chords due to change in the position of the platform.

Having thus described my invention, what I claim is:—

1. A loading device for vehicles, comprising the combination with a vehicle floor of a cantaliver structure pivotally anchored at one end to the vehicle and having load bearing and hoisting connection with the vehicle intermediate its ends, and a loading floor carried by the unanchored end of the cantaliver structure.

2. A device according to claim 1, in which the cantaliver frame is jointed and pivotally connected to the vehicle floor.

3. A device according to claim 1, in which the load support comprises a hoisting appliance including a chain and a winding drum therefor.

4. A device according to claim 1, in which the cantaliver structure is foldable.

5. A device according to claim 1, in which the cantaliver structure comprises a center strut, a bottom chord each half of which is pivotally connected to the lower end of the strut and a top chord each half of which is pivotally connected to the top of the strut, one end of the top chord being releasably connected to the adjacent end of the bottom chord and the opposite ends of both chords being pivotally connected to the vehicle body.

6. A device according to claim 5, in which the chord ends are pivoted at different points on the vehicle body.

7. A device of the character described, comprising the combination with a vehicle floor of a cantaliver structure comprising a center strut, a top chord inner end pivotally connected at one extremity to the floor and at the opposite extremity to the top of the strut, a bottom chord inner end pivotally connected at one extremity to the vehicle body and pivotally connected at the opposite extremity to the bottom of the strut, bottom and top chord outer ends pivotally connected to the bottom and top respectively of the strut and pivotally connected together at their free extremities, and a floor supported by the bottom chord outer end.

8. A device according to claim 7, in which the top chord inner end has sliding as well as pivotal connection with the strut top.

9. In combination with a device according to claim 7, a slide movable longitudinally of the top chord inner end and pivotally connected to the top of the strut, said slide forming connection between the strut and chord.

10. In combination with a device according to claim 7, a slide pivotally connected to the upper end of the strut and the inner extremity of the top chord outer end and slidably mounted on the top chord inner end.

11. A device according to claim 7, in which the top and bottom chords each comprise duplicate members located at opposite sides of the vehicle floor and separate in themselves, and the strut comprises a single U-shaped member connecting the members of the bottom and top chords at opposite sides of the floor.

12. A device according to claim 7, in which the free extremities of the top chord inner parts are apertured for securement at the pivotal connection of the strut and bottom chord parts.

13. In combination with a device according to claim 7, studs connecting the strut and bottom chord parts and projecting laterally therefrom to support the top chord parts, said top chord parts being formed for coöperation with said studs, and cotter pins holding the top chord parts on said stud during folded position of the cantaliver structure.

14. A device according to claim 1, in which the cantaliver structure is jointed intermediate its ends and the bottom and top chords thereof pivotally anchored at remote points whereby the cantaliver structure may be hinged upon itself without substantial displacement of the cantaliver strut from its normal plane.

15. A device according to claim 1, in which the loading floor includes the tailboard of the vehicle.

In witness whereof, I have hereunto set my hand.

PAUL DUCONDU.